Dec. 29, 1931.  A. FROGET  1,839,022

LUMINAIR

Filed April 25, 1930  2 Sheets-Sheet 1

INVENTOR.
André Froget
BY
Jacob Shiberman
ATTORNEY.

Dec. 29, 1931.  A. FROGET  1,839,022
LUMINAIR
Filed April 25, 1930   2 Sheets-Sheet 2
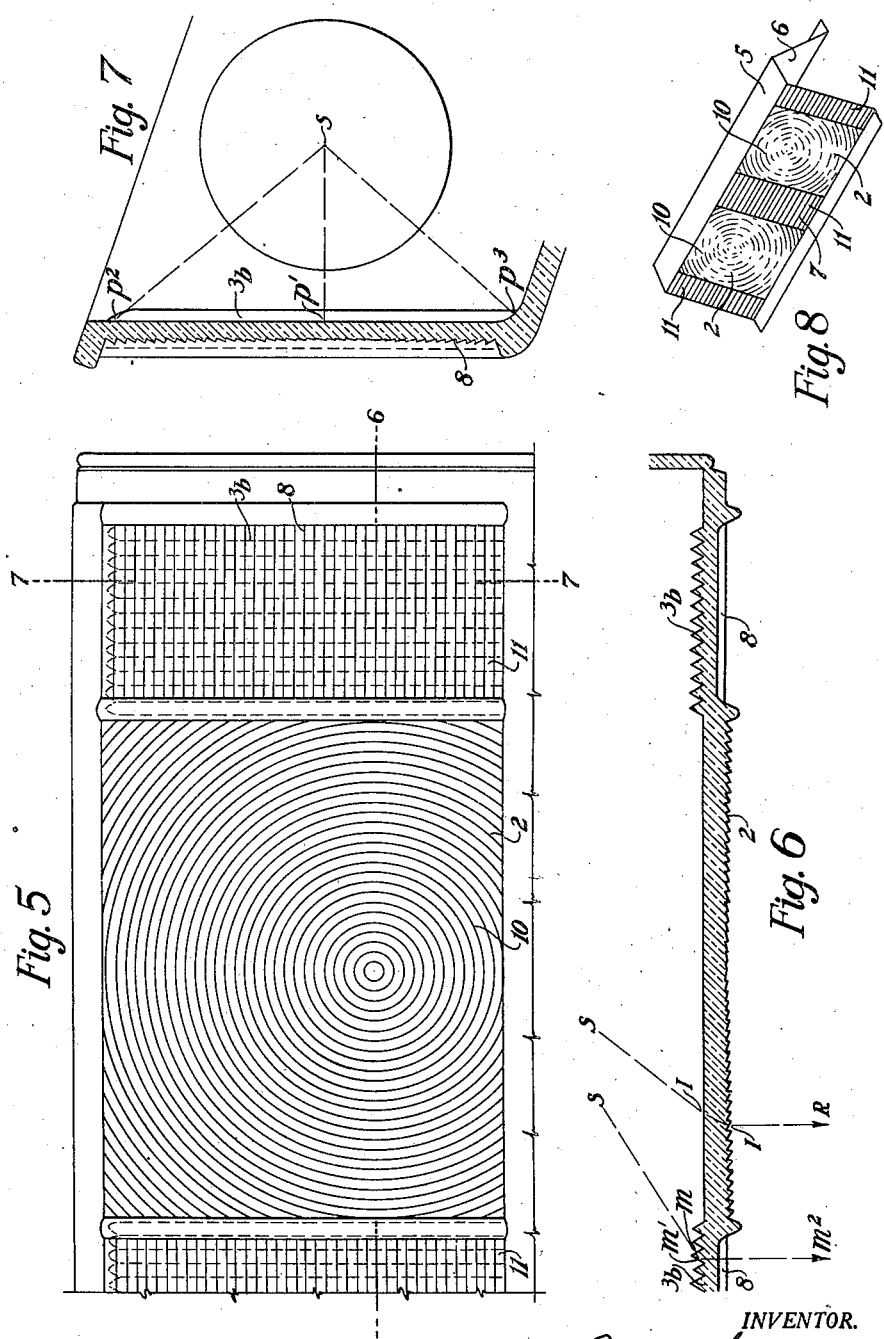
INVENTOR.
André Froget
BY
Jules Huberman
ATTORNEY.

Patented Dec. 29, 1931

1,839,022

UNITED STATES PATENT OFFICE

ANDRE FROGET, OF PARIS, FRANCE, ASSIGNOR TO HOLOPHANE COMPANY, INC., OF NEW YORK, N. Y., A CORPORATION OF DELAWARE

LUMINAIR

Application filed April 25, 1930, Serial No. 447,139, and in France May 10, 1929.

The object of this invention is the manufacture of a form of glassware for concentrating luminous flux emitted by a lamp which acts on a greater proportion of the flux than glassware made hitherto.

Prismatic glassware of the simple concentrating type manufactured to date, for example, ordinary flat concentrating lens, can only act on light to produce a beam normal to the plate within a cone having its apex at the center of the luminous source, the angle of the apex being 90° corresponding to about one-seventh of the total flux. A lens or a concentrating plate manufactured according to the present invention utilizes a part of the luminous flux, theoretically equal to one half of the total flux emitted and practically much greater than that utilized by the usual glassware.

Glassware of the ordinary type has on its exterior face opposed to the light source, prisms receiving light rays already refracted once on the inside face and giving them a second refraction which bends them along the normal to the plate, but as the angle of incidence of the light rays with the surface increases, the quantity of reflected light at each refraction increases, which forces the angle of incidence to be limited to 45° maximum. At this outside angular limit, the light is incident on the inner surface at an angle quite favorable for refraction, but it is not sufficiently deviated toward the normal to permit the use of a moderate angle of incidence at the outside prism surface. As soon as you attempt to concentrate light incident at wider angles the necessary angle of incidence at the outside prism surface approaches the critical angle so closely as to cause large reflection losses. There is no sudden change from refraction to reflection at this particular limiting angle of incidence, but experience indicates that reflection losses increase so rapidly beyond this angle that it is a good practical limit.

According to the present invention, in addition to the usual zone of double refraction we can employ a zone of total reflecting prisms toward the exterior following the normal to the surface, and utilize rays which have penetrated into the glass by refraction. Theoretically these prisms can act for angles of incidence as large as we desire and in any case much larger than 45°.

According to the invention, two prismatic zones are obtained on the same plate with a single pressing operation in a normal mold, the central zone comprising in the usual fashion an interior smooth face and having prisms on its exterior face, the lateral zone on the other hand having an exterior smooth face and having prisms on its inner face.

The invention can be applied in different manners as is further explained.

The figures annexed hereto show different forms of carrying out the invention.

Figs. 5 to 8 show a further embodiment of another variety of the invention in which, Fig. 5 is an elevation of a central plate and two adjacent side plates, one partially cut away.

Fig. 6 is a section on line 6—6 of Figure 5.

Fig. 7 is a section on line 7—7 of Figure 5 and Fig. 8 is a perspective view in small scale of the complete embodiment.

Figure 1:
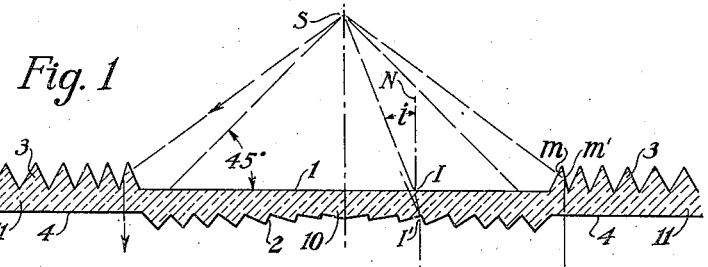
Fig. 1 is a transverse section of a glass according to the invention.

As we see from Fig. 1, a plate according to my present invention includes, in addition to the usual central zone 10 permitting the redirection of rays inclined at angles smaller than 45°, a surrounding zone 11 operating on rays incident at greater angles.

Figure 2:
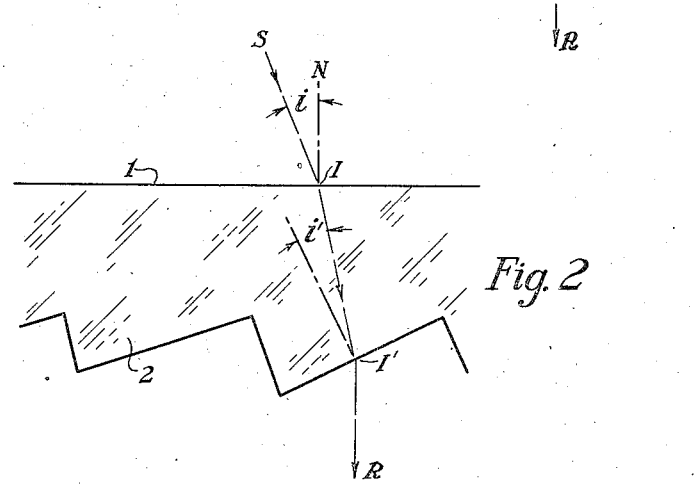
Figs. 2 and 3 are detail views in larger scale.

The central zone 10 of the plate has on the side facing the light source S, a smooth surface 1, and on the opposite side, a series of annular prisms 2 of which the inclinations vary gradually as they are removed from the center. A typical ray SI is refracted once in direction II′ and a second time following direction I′ R normally to the plate. As the angle of incidence $i$ increases, that is to say, as the inclination of ray SI is increased, the quantity of reflected light I is increased. As shown in enlarged section in Fig. 2 the angle of incidence $i′$ on the refracting surface of the prism and the light reflected at the second refraction will increase in the same way; a point is reached then, where the quantity of reflected light is greater than the refracted light. In practice if the light rays are to be emitted normal to the plate we are, therefore, forced to limit the system to an angle of incidence $i$ not greater than 45°.

Figure 3:
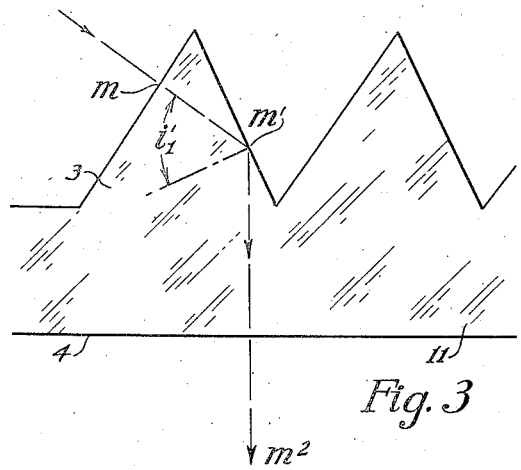

According to the invention, we surround such a central zone 10 with another zone 11 in which the prisms 3 of its interior face act by reflection; that is to say, a direct ray $m$, striking the prism is refracted in direction $m'—m^2$ and reaches the opposite face of the prisms at an angle $i$, greater than the angle of total reflection. As shown in enlarged section in Fig. 3 it is therefore totally reflected in direction $m'—m^2$. The angle of each prism of that zone varies of course as a function of the distance from the source S in order that the ray $m'$ $m^2$ be normal to the smooth exterior surface 4. In this case where the glassware is intended for a single light source the prisms 3 of the lateral zone will be annular as are the prisms 2 of the central zone and concentric with them.

The structure described above provides for emission of light rays from the plate in direction normal to the plate. In some designs it may be desirable to permit the emergent rays to diverge somewhat from the normal. This will make it possible to extend the central zone to somewhat greater angles of incidence than 45° but with any required divergence of emergent rays there will be a practical limit for angle of incidence on the central zone beyond which the refracting structure used on the central zone would be inefficient and the annular reflecting zone will work efficiently.

Figure 4:
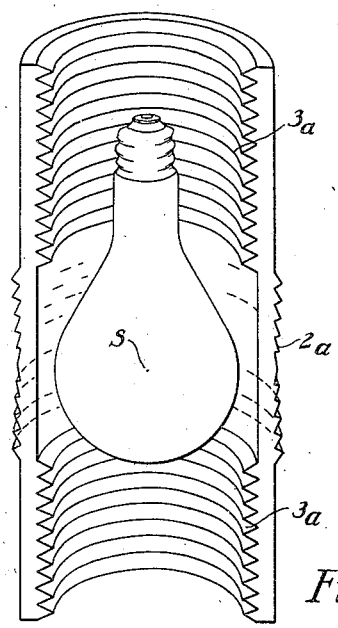
Fig. 4 shows a section of glass of a different type but coming under the invention.

The invention can be applied to different types of glassware, for example to conical or cylindrical glassware as in Fig. 4 intended to redirect normally to the axis, the rays of a series of luminous sources S placed on the inside. These sources will each be placed in the middle of a zone of exterior prisms 2a acting as prisms 2 (Fig. 1), between these zones other zones will be provided having on the interior prisms 3a acting like prisms 3. Elements as shown in Fig. 4 placed end to end permit the manufacture of luminous columns in which the lateral zones 3a act simultaneously on the rays of two neighboring luminous sources and permit you to obtain a practically continuous beam. It should be realized that these tubular elements cannot be manufactured in a single piece but must be made in two semi-cylindrical or semi-conical pieces.

Figs. 5 to 8 show a variation of the invention intended also to operate on rays from a series of sources disposed in a straight line, one following the other and designed to form a sort of luminous cove presenting a concentrating face. In Fig. 8, the combination forms a sort of an easel in which the rear sections 5 and 6 are opaque or diffusing and face 7 is a single or double system according to the present invention.

In Figs. 5 to 6 inclusive, the central zone 10 opposite each of the lamps is made as in Fig. 1 with annular prisms 2 in which the luminous rays follow the usual directions $S11'R$. On the other hand, the interior prisms of the lateral zones 11 intermediate between the two zones 10 are designed to act on rays provided by two adjacent sources and cannot at the same time be concentric to both of the sources; they are, therefore, composed of rectilinear prisms 3b disposed perpendicularly to the length of the device and act on rays according to the direction $s—m—m'—m^2$ as in Fig. 6.

This construction has consequently in the transverse plane (Fig. 7) only ray $s\ p'$, which can reach prisms 3b normally, extreme rays $s\ p^2$ and $s\ p^3$ for example making great angles with the face of the structure.

In order to direct rays thus deviated by interior prisms 3b in approximately normal directions it is necessary to place on the outside an auxiliary system of reflecting prisms 8 at right angles with interior prisms 3b, which will correct the divergence of the rays emitted between $s\ p^2$ and $s\ p^3$. It is understood that this system of auxiliary prisms does not change the principle of the invention.

This invention besides is also capable of numerous variations, the present exposition being chosen merely as examples.

I claim:

1. A luminair comprising a light source, a prismatic light concentrating structure co-operating therewith and provided on one surface with refracting prisms and adjacent thereto but oppositely disposed on the surface of the glass a series of reflecting prisms.

2. A luminair comprising a light source, a prismatic light concentrating structure co-operating therewith and provided on one surface with annular refracting prisms and adjacent thereto but oppositely disposed on the surface of the glass a series of concentric reflecting prisms.

3. A luminair comprising a light source, a prismatic light concentrating structure co-operating therewith and provided on one surface with parallel refracting prisms and adjacent therewith but oppositely disposed on the surface of the glass a series of parallel reflecting prisms acting on the light incident from such source.

4. A luminair comprising a prismatic glass structure adapted to concentrate light rays from a definite source, having a central zone which deviates the incident light rays by refraction into emergent directions more nearly normal to the general surface of the structure and adjacent outer zones having prisms on the interior surfaces which successively refract and reflect the incident light rays to the exterior surface so that they emerge substantially normal or slightly divergent with respect to the normal of the general surface of the structure.

5. A prismatic light concentrating construction having in combination, a lenticular zone and adjacent thereto a zone provided with prisms on the inner surface receiving light from the source and reflecting and transmitting it through the glass so that it emerges substantially normal or slightly divergent with respect to the normal of the general surface of the structure.

6. A luminair having a plurality of light sources, a prismatic light concentrating construction cooperating therewith which consists of a lens immediately opposed to each light source and intermediate sections provided on the inner surface with transverse parallel prisms adapted to receive light rays from the two adjacent sources and reflect them through the structure so that they emerge substantially normal or slightly divergent with respect to the normal of the general surface of the structure.

Signed at Paris, France, this 14th day of April, 1930.

ANDRE FROGET.